United States Patent
Kim et al.

(10) Patent No.: US 12,049,207 B2
(45) Date of Patent: Jul. 30, 2024

(54) ELECTRONIC BRAKE SYSTEM AND OPERATION METHOD

(71) Applicant: HL MANDO CORPORATION, Pyeongtaek (KR)

(72) Inventors: Jin Seok Kim, Suwon (KR); Seong Ho Choi, Anyang (KR)

(73) Assignee: HL MANDO CORPORATION, Pyeongtaek (KR)

(*) Notice: Subject to any disclaimer, the term of this patent is extended or adjusted under 35 U.S.C. 154(b) by 387 days.

(21) Appl. No.: 17/614,284

(22) PCT Filed: Apr. 29, 2020

(86) PCT No.: PCT/KR2020/005806
§ 371 (c)(1),
(2) Date: Nov. 24, 2021

(87) PCT Pub. No.: WO2020/242069
PCT Pub. Date: Dec. 3, 2020

(65) Prior Publication Data
US 2022/0250601 A1 Aug. 11, 2022

(30) Foreign Application Priority Data
May 31, 2019 (KR) .................. 10-2019-0064851

(51) Int. Cl.
*B60T 13/74* (2006.01)
*B60T 8/40* (2006.01)
(Continued)

(52) U.S. Cl.
CPC .......... *B60T 13/686* (2013.01); *B60T 8/4086* (2013.01); *B60T 13/142* (2013.01); *B60T 13/148* (2013.01);
(Continued)

(58) Field of Classification Search
CPC .... B60T 13/745; B60T 13/686; B60T 8/4086; B60T 8/409; B60T 13/142; B60T 13/148;
(Continued)

(56) References Cited

U.S. PATENT DOCUMENTS 5,544,948 A * 8/1996 Schmidt .................. B60T 7/042
60/566
5,729,979 A 3/1998 Shaw
(Continued)

FOREIGN PATENT DOCUMENTS

JP 2006256408 A 9/2006
KR 20150138295 A 12/2015
(Continued)

OTHER PUBLICATIONS

International Search Report issued on Aug. 28, 2020.

*Primary Examiner* — Bradley T King
(74) *Attorney, Agent, or Firm* — Harvest IP Law, LLP

(57) ABSTRACT

Disclosed herein an electronic brake system includes a hydraulic pressure supply device including a first pressure chamber and a second pressure chamber partitioned by a hydraulic piston, and a hydraulic control unit, wherein the hydraulic control unit comprises a first hydraulic flow path connecting the first pressure chamber and one of the first and second hydraulic circuits, a second hydraulic flow path branched from the first hydraulic flow path to connect to the other one of the first and second hydraulic circuits, a third hydraulic flow path branched from the first hydraulic flow path on upstream side of a branch point of the second hydraulic flow path to connect the second pressure chamber, and a fourth hydraulic flow path branched from the first hydraulic flow path on upstream side of a branch point of the third hydraulic flow path to connect the third hydraulic flow path.

19 Claims, 8 Drawing Sheets

(51) Int. Cl.
*B60T 13/14* (2006.01)
*B60T 13/68* (2006.01)
*B60T 17/04* (2006.01)

(52) U.S. Cl.
CPC ......... *B60T 17/04* (2013.01); *B60T 2270/402* (2013.01); *B60T 2270/404* (2013.01); *B60T 2270/82* (2013.01)

(58) Field of Classification Search
CPC .............. B60T 17/04; B60T 2270/402; B60T 2270/404; B60T 2270/82
See application file for complete search history.

(56) References Cited

U.S. PATENT DOCUMENTS

| | | | | |
|---|---|---|---|---|
| 6,347,518 | B1* | 2/2002 | Kingston | B60T 8/4081 |
| | | | | 92/84 |
| 11,312,349 | B2* | 4/2022 | Park | B60T 8/409 |
| 11,780,417 | B2* | 10/2023 | Park | B60T 13/745 |
| | | | | 303/113.4 |
| 2005/0001476 | A1* | 1/2005 | Kusano | B60T 17/04 |
| | | | | 303/113.4 |
| 2005/0104443 | A1* | 5/2005 | Kusano | B60T 8/38 |
| | | | | 303/3 |
| 2010/0283315 | A1* | 11/2010 | Isono | B60T 8/4086 |
| | | | | 303/9.75 |
| 2014/0117602 | A1* | 5/2014 | Jeon | B60T 11/18 |
| | | | | 267/170 |
| 2017/0144642 | A1* | 5/2017 | Kim | B60T 13/745 |
| 2017/0158180 | A1* | 6/2017 | Kim | B60T 13/146 |
| 2017/0334417 | A1* | 11/2017 | Choi | B60T 13/686 |
| 2018/0111593 | A1* | 4/2018 | Kim | B60T 8/88 |
| 2019/0061720 | A1* | 2/2019 | Kunz | B60T 8/409 |
| 2019/0092300 | A1* | 3/2019 | Jeong | B60T 13/686 |
| 2019/0092301 | A1* | 3/2019 | Jeong | B60T 8/4081 |
| 2019/0100183 | A1* | 4/2019 | Jung | B60T 7/042 |
| 2019/0100186 | A1* | 4/2019 | Jeong | B60T 13/145 |
| 2019/0100187 | A1* | 4/2019 | Jeong | B60T 7/042 |
| 2019/0275997 | A1* | 9/2019 | Park | B60T 13/18 |
| 2022/0242381 | A1* | 8/2022 | Kim | F16K 31/62 |

FOREIGN PATENT DOCUMENTS

| | | |
|---|---|---|
| KR | 20160028043 A | 3/2016 |
| KR | 20170130995 A | 11/2017 |

* cited by examiner

[FIG. 1]
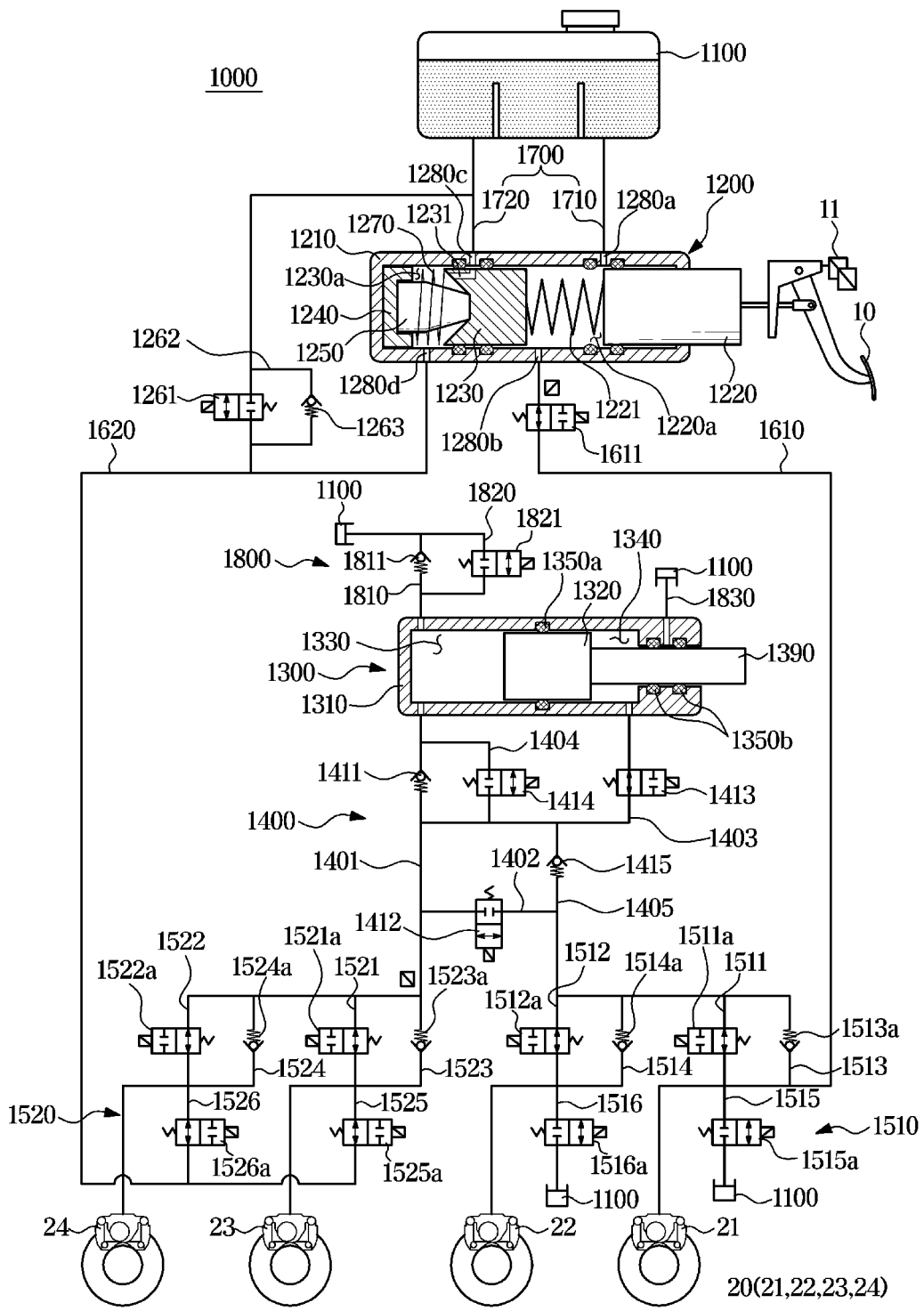

[FIG. 2]
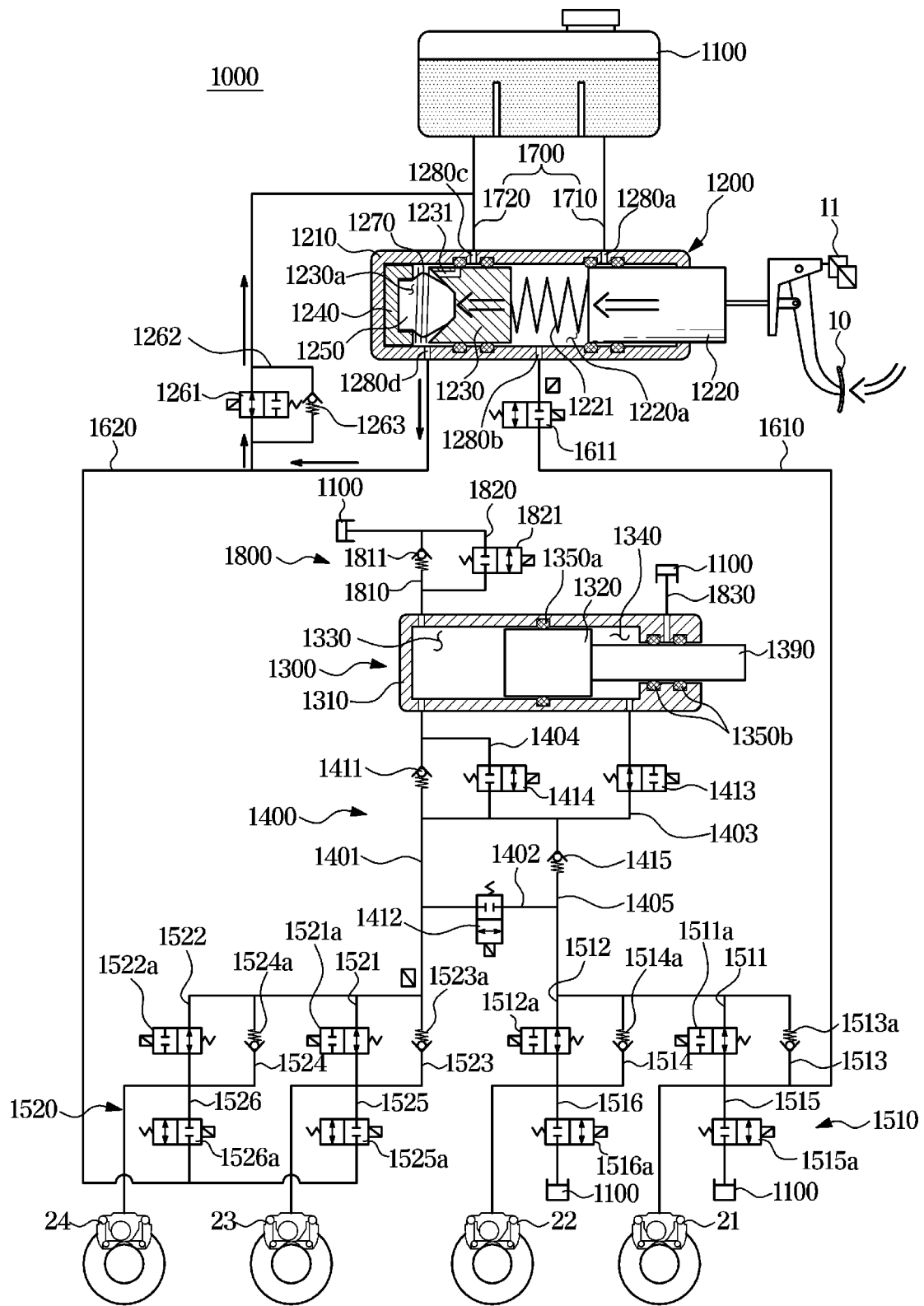

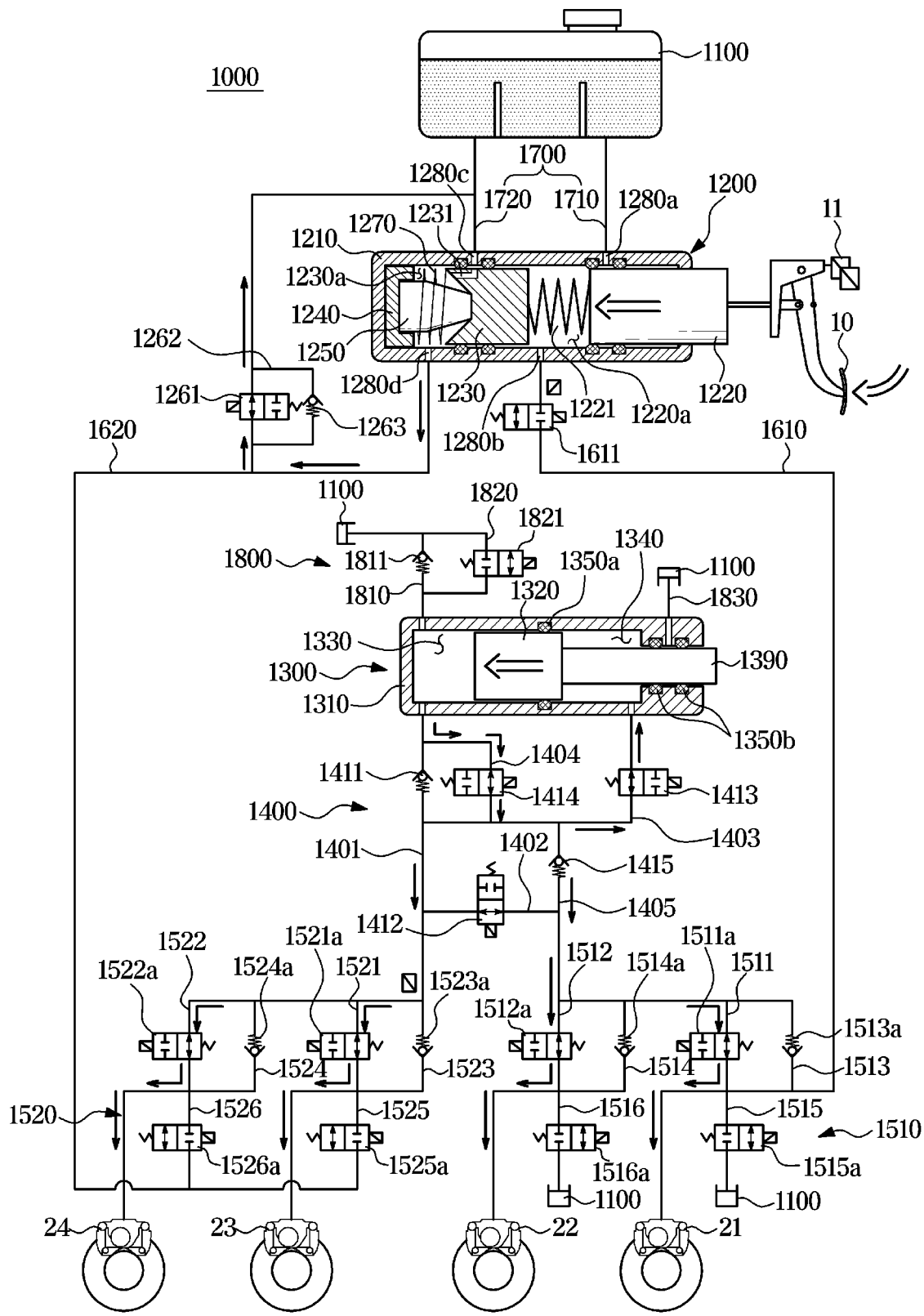
[FIG. 3]

[FIG. 4]
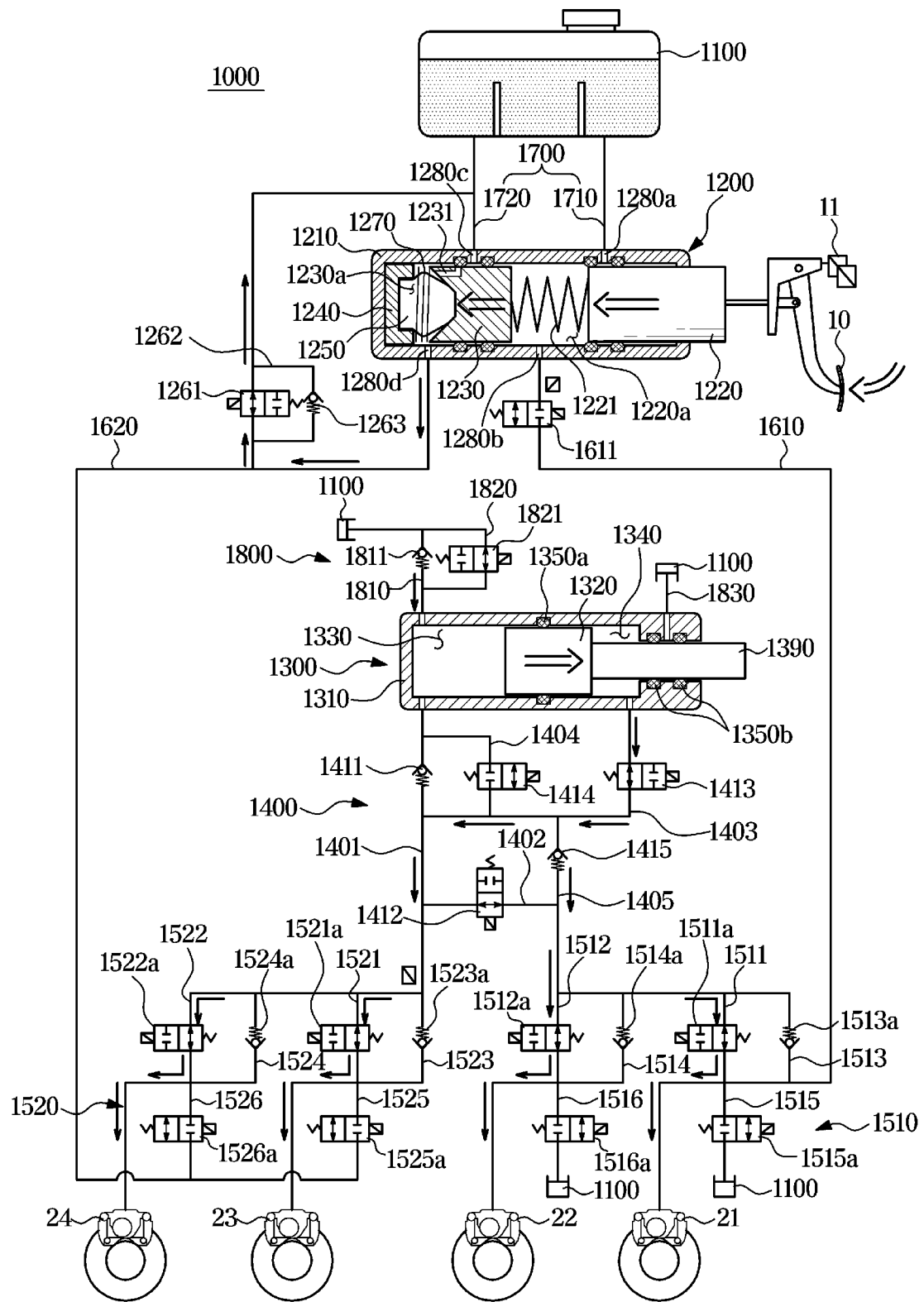

[FIG. 5]
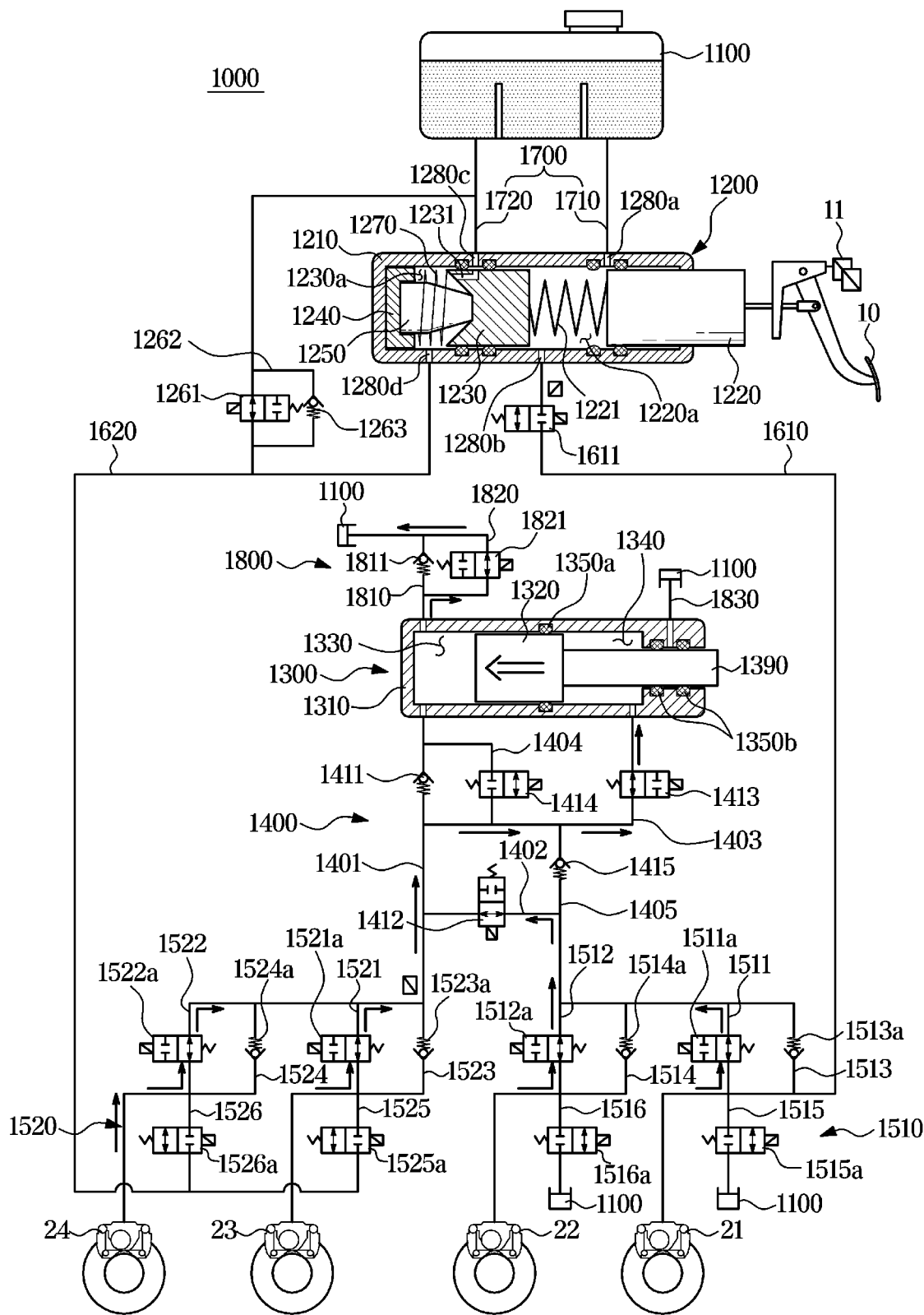

[FIG. 6]
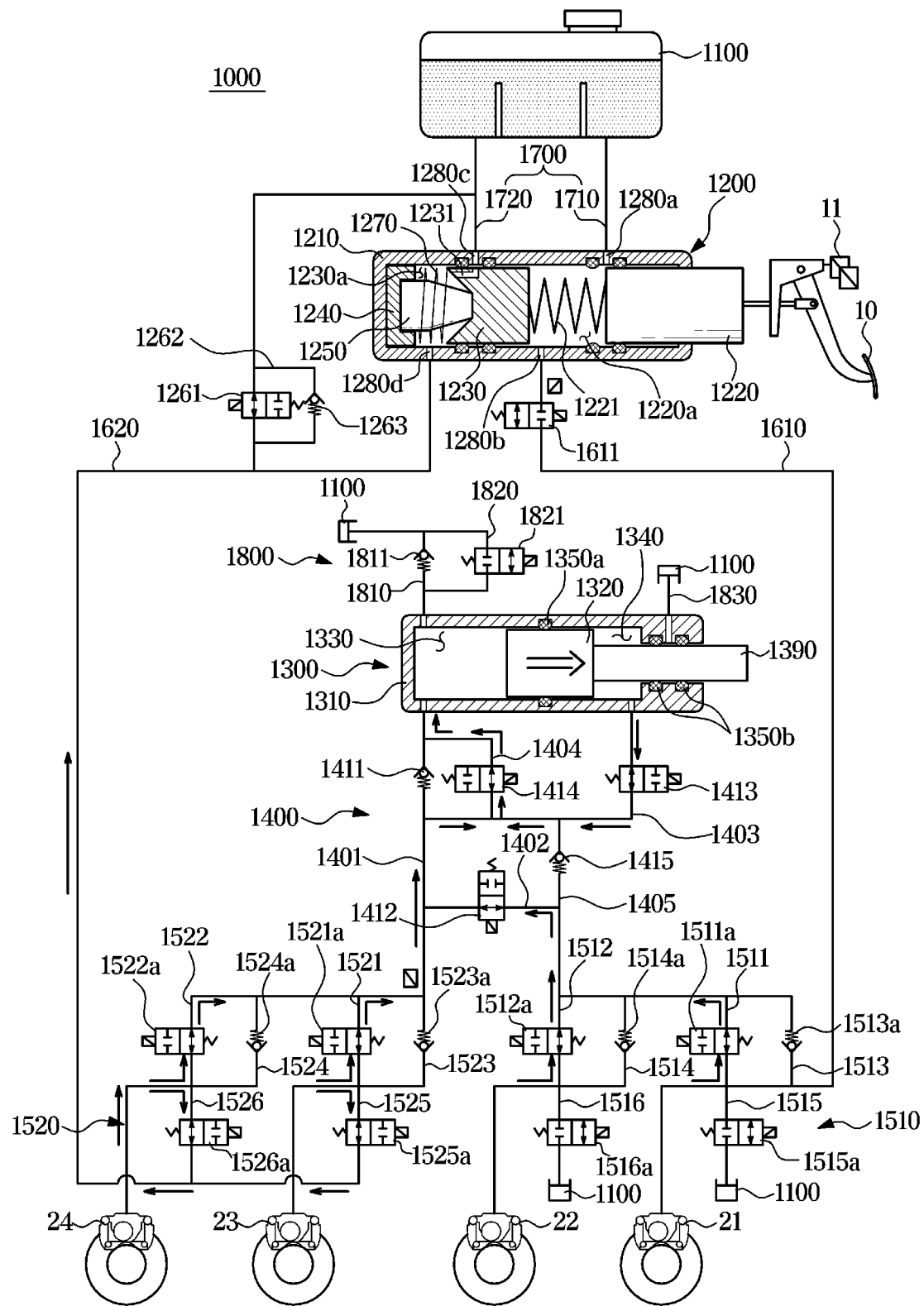

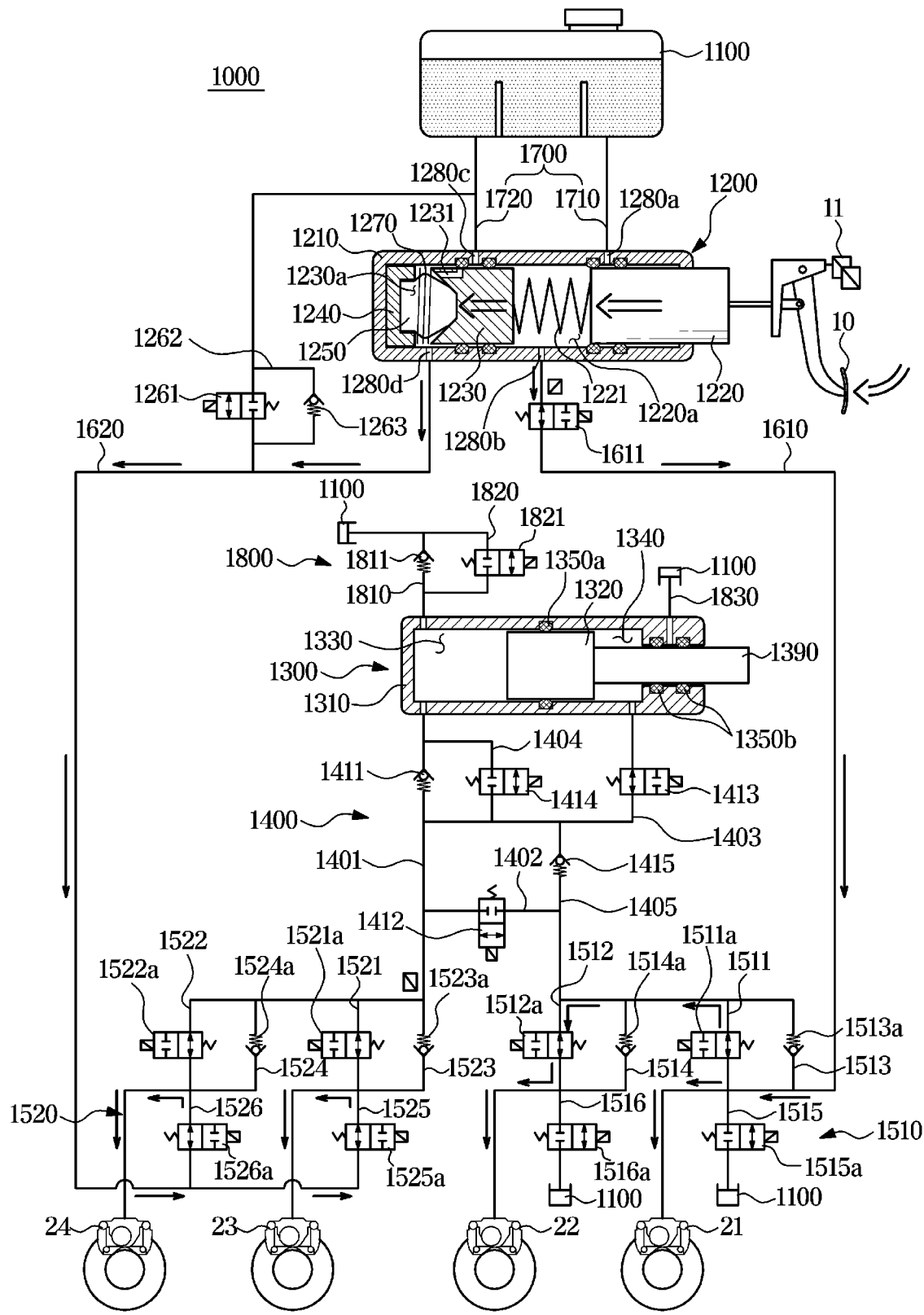
[FIG. 7]

[FIG. 8]
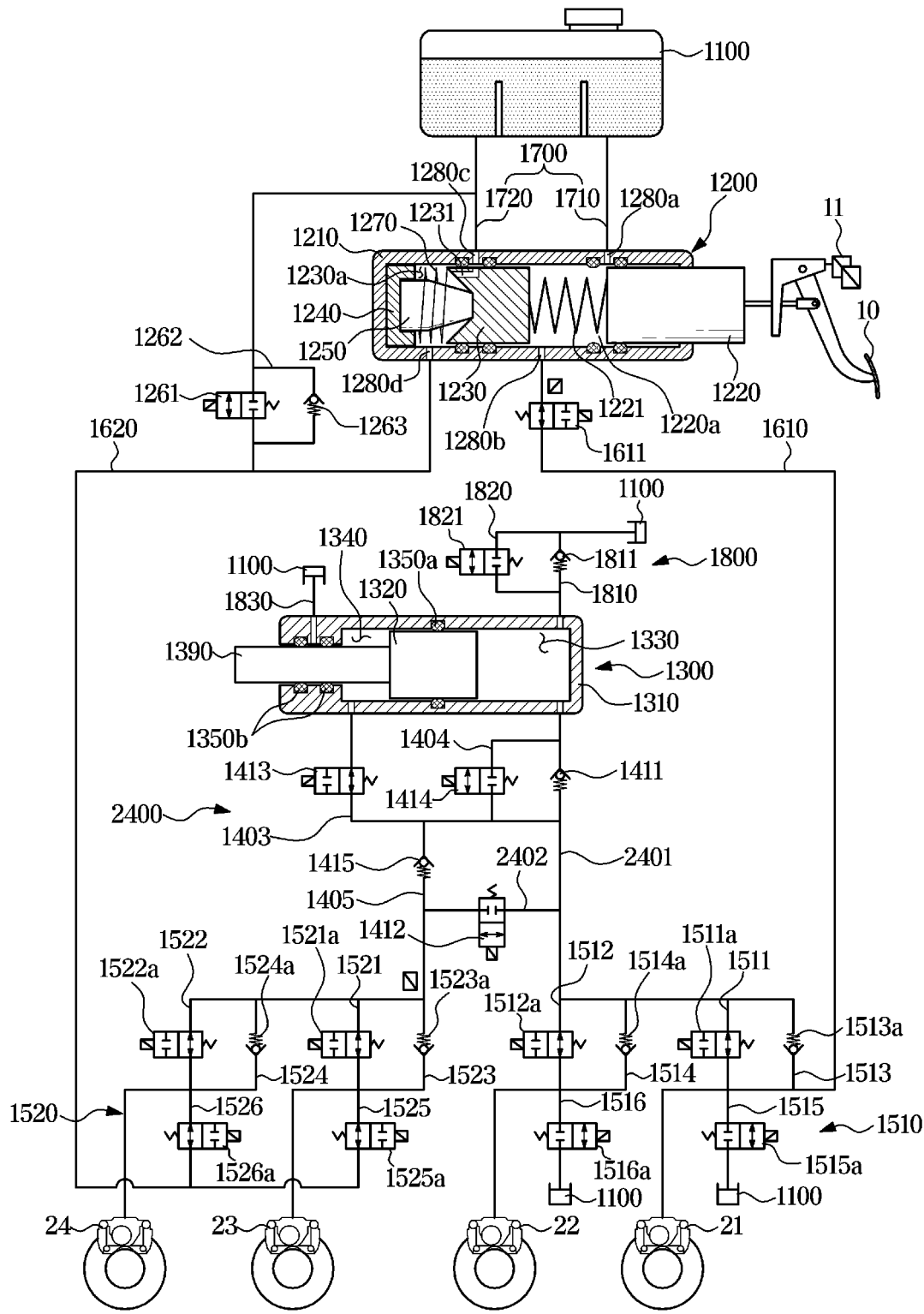

ELECTRONIC BRAKE SYSTEM AND OPERATION METHOD

CROSS-REFERENCE TO RELATED APPLICATIONS

This application is a National Stage of International Application No. PCT/KR2020/005806 filed Apr. 29, 2020, claiming priority based on Korean Patent Application No. 10-2019-0064851 filed May 31, 2019.

TECHNICAL FIELD

The disclosure relates to an electronic brake system and a method of operating the same, and more specifically, to an electronic brake system for generating braking force using an electrical signal corresponding to a displacement of a brake pedal and a method of operating the same.

BACKGROUND ART

Vehicles are essentially equipped with a brake system for performing braking, and various types of brake systems have been proposed for the safety of drivers and passengers.

In a conventional brake system, a method of supplying hydraulic pressure necessary for braking to wheel cylinders using a mechanically connected booster when a driver depresses a brake pedal has been mainly used. However, as market demands to implement various braking functions in a detailed response to operation environments of vehicles increase, in recent years, an electronic brake system and an operation method thereof, which include a hydraulic pressure supply device that receives an electrical signal corresponding to a pressing force of a driver from a pedal displacement sensor that detects a displacement of a brake pedal when the driver depresses the brake pedal and supplies hydraulic pressure necessary for braking to wheel cylinders, have been widely used.

In such an electronic brake system and operation method thereof, a driver's brake pedal operation is generated and provided as an electrical signal in a normal operation mode, and based on this, a hydraulic pressure supply device is electrically operated and controlled to generate hydraulic pressure required for braking and transmit the hydraulic pressure to wheel cylinders. Although such an electronic brake system and operation method thereof are electrically operated and controlled so that complex and various braking operations may be implemented, when a technical problem occurs in an electrical component, hydraulic pressure required for braking may not be stably generated, and thus the safety of passengers may not be secured. Accordingly, an electronic brake system and operation method thereof enter an abnormal operation mode when a component is broken or falls under control. In this case, a mechanism in which a driver's brake pedal operation is directly interworked with the wheel cylinders is required. In other words, in the abnormal operation mode of the electronic brake system and the operating method thereof, as the driver applies a pedal force to the brake pedal the hydraulic pressure required for braking must be directly generated and the generated hydraulic pressure directly transmitted to the wheel cylinders.

DISCLOSURE

Technical Problem

As an aspect of the disclosure is to provide an electronic brake system capable of reducing the number of parts and reducing size and weight of the product by integrating the master cylinder and the simulation device into one, and a method of operating the same.

As another aspect of the disclosure is to provide an electronic brake system capable of implementing stable and effective braking in various operating conditions, and a method of operating the same.

As another aspect of the disclosure is to provide an electronic brake system capable of stably generating a high-pressure braking pressure, and a method of operating the same.

As another aspect of the disclosure is to provide an electronic brake system having improved performance and operational reliability, and a method of operating the same.

As another aspect of the disclosure is to provide an electronic brake system capable of improving assembly and productivity of the product and reducing manufacturing cost of the product, and a method of operating the same.

Technical Solution

According to an aspect of the disclosure, an electronic brake system includes a reservoir configured to store a pressurized medium; an integrated master cylinder including a master chamber and a simulation chamber; a reservoir flow path configured to communicate the integrated master cylinder with the reservoir; a hydraulic pressure supply device including a first pressure chamber and a second pressure chamber partitioned by a hydraulic piston moving in a cylinder block by an electrical signal output in response to a displacement of a brake pedal; a first hydraulic circuit and a second hydraulic circuit configured to control hydraulic pressure of wheel cylinders; and a hydraulic control unit configured to control a flow of the hydraulic pressure provided from the hydraulic pressure supply device to the first and second hydraulic circuits; wherein the hydraulic control unit comprises a first hydraulic flow path connecting the first pressure chamber and one of the first and second hydraulic circuits so as to provide the hydraulic pressure of the first pressure chamber to one of the first and second hydraulic circuits; a second hydraulic flow path branched from the first hydraulic flow path to connect to the other one of the first and second hydraulic circuits so as to provide the hydraulic pressure of the first hydraulic flow path to the other one of the first and second hydraulic circuits; a third hydraulic flow path branched from the first hydraulic flow path on upstream side of a branch point of the second hydraulic flow path to connect the second pressure chamber so as to provide the hydraulic pressure of the second pressure chamber to the first hydraulic flow path; and a fourth hydraulic flow path branched from the first hydraulic flow path on upstream side of a branch point of the third hydraulic flow path to connect the third hydraulic flow path so as to flow selectively the pressurized medium between the first pressure chamber and the second pressure chamber.

The hydraulic control unit may include a first valve provided in the first hydraulic flow path between respective branch points of the third and fourth hydraulic flow paths to control the flow of the pressurized medium; a second valve provided in the second hydraulic flow path to control the flow of the pressurized medium; a third valve provided in the third hydraulic flow path on upstream side of a junction of the third and fourth hydraulic flow paths to control the flow of the pressurized medium; and a fourth valve provided in the fourth hydraulic flow path to control the flow of the pressurized medium.

The first valve may include a check valve allowing only a flow of the pressurized medium from the hydraulic pressure supply device toward the wheel cylinders, and the second to fourth valves comprises a solenoid valve for controlling a bidirectional flow of the pressurized medium.

The integrated master cylinder may include a master piston provided to be displaceable by the brake pedal and pressurizing the master chamber; a simulation piston provided to be displaceable by the hydraulic pressure of the pressurized medium accommodated in the master chamber and pressurizing the simulation chamber; and an elastic member provided in the simulation chamber and providing a reaction force to the simulation piston; wherein the master piston, the simulation piston, and the elastic member are sequentially arranged in a line in the cylinder block of the integrated master cylinder.

The electronic brake system may further include a first backup flow path connecting the master chamber and the first hydraulic circuit and including a first cut valve configured to control the flow of the pressurized medium; and a second backup flow path connecting the simulation chamber and the second hydraulic circuit and including a second cut valve configured to control the flow of the pressurized medium.

The reservoir flow path may include a first reservoir flow path connecting the reservoir and the master chamber; and a second reservoir flow path connecting the reservoir and the simulation chamber.

The electronic brake system may further include a simulation flow path connecting the second backup flow path and the second reservoir flow path; a simulator valve provided in the simulation flow path to control the flow of the pressurized medium in the simulation flow path; and a simulator bypass flow path connected in parallel with the simulator valve on the simulation flow path and provided with a simulator check valve allowing only a flow of the braking fluid transmitted from the second reservoir flow path to the second backup flow path.

The first hydraulic circuit may include first and second inlet flow paths branched from the second hydraulic flow path to connect to first and second wheel cylinders, respectively, the first and second inlet flow paths including first and second inlet valves, respectively; first and second inlet bypass flow paths connected in parallel to the first and second inlet valves on the first and second inlet flow paths, respectively, and provided with first and second check valves allowing only the flow of the pressurized medium toward the second hydraulic flow path; first and second outlet flow paths branched from the first and second inlet flow paths on downstream side of the first and second inlet valves, respectively to connect to the reservoir, and provided with first and second outlet valves, respectively.

The second hydraulic circuit may include third and fourth inlet flow paths branched from the first hydraulic flow path to connect to third and fourth wheel cylinders, respectively, the third and fourth inlet flow paths including third and fourth inlet valves, respectively; third and fourth inlet bypass flow paths connected in parallel to the third and fourth inlet valves on the third and fourth inlet flow paths, respectively, and provided with third and fourth check valves allowing only the flow of the pressurized medium toward the first hydraulic flow path; third and fourth outlet flow paths branched from the third and fourth inlet flow paths on downstream side of the third and fourth inlet valves, respectively to connect to the second backup flow path.

The electronic brake system may further include a dump flow path connecting between the first pressure chamber and the reservoir and provided with a dump check valve allowing only the flow of the pressurized medium toward the first pressure chamber; and a dump bypass flow path connected in parallel to the dump check valve on the dump flow path and provided with a dump valve configured to control the flow of the pressurized medium.

The hydraulic control unit may further include a fifth hydraulic flow path connecting the third hydraulic flow path and the second hydraulic flow path so as to provide the pressurized medium of the third hydraulic flow path to the other one of the first and second hydraulic circuits.

The hydraulic control unit may further include a fifth valve provided in the fifth hydraulic flow path to control the flow of the pressurized medium; and the fifth valve comprises a check valve allowing only the flow of the pressurized medium from the hydraulic pressure supply device toward the wheel cylinders.

According to another aspect of the disclosure, a method of operating the electronic brake system described above, the method may include a first braking mode in which the hydraulic piston presses the first pressure chamber, and a second braking mode in which the hydraulic piston presses the second pressure chamber after the first braking mode.

In the first braking mode, the second valve, the third valve, and the fourth valve may be open, and the hydraulic pressure of the first pressure chamber may be provided to the second pressure chamber through the third hydraulic flow path and may be provided to the first and second hydraulic circuits through the first and second hydraulic flow paths.

In the second braking mode, the second and third valves may be open, the fourth valve may be closed, and the hydraulic pressure of the second pressure chamber may pass through the third hydraulic flow path, and the first and second hydraulic flow paths in sequence to be provided to the first and second hydraulic circuits, respectively.

In releasing of the first braking mode, by a negative pressure formed in the first pressure chamber by moving the hydraulic piston to press the second pressure chamber in the first braking mode, the pressurized medium provided in the first and second hydraulic circuits and the pressurized medium of the first pressure chamber may be recovered to the first pressure chamber.

In releasing of the second braking mode, by a negative pressure formed in the second pressure chamber by moving the hydraulic piston to press the first pressure chamber in the second braking mode, the pressurized medium of the first pressure chamber is provided to the reservoir while the pressurized medium provided in the first and second hydraulic circuits may be recovered to the first pressure chamber.

According to another aspect of the disclosure, a method of operating the electronic brake system described above, the method may include in a normal operation mode, the first cut valve and the second cut valve may be closed, the simulator valve may be open, the hydraulic pressure of the master chamber pressurized by the master piston due to the operation of the brake pedal may move the simulation piston to compress the elastic member, and the reaction force of the elastic member may be provided to a driver as a pedal feel.

In abnormal operation mode, the first cut valve, the second cut valve, and the simulator valve may be open, the hydraulic pressure of the master chamber pressurized by the master piston due to the operation of the brake pedal may be transmitted to the first hydraulic circuit through the first backup flow path, and the hydraulic pressure of the simulation chamber pressurized by the simulation piston may be provided to the second hydraulic circuit through the second backup flow path.

Advantageous Effects

The electronic brake system and a method of operating the same according to embodiments of the disclosure may reduce the number of parts and reducing size and weight of the product by integrating the master cylinder and the simulation device into one.

The electronic brake system and a method of operating the same according to embodiments of the disclosure may implement stable and effective braking in various operating conditions.

The electronic brake system and a method of operating the same according to embodiments of the disclosure may stably generate a high-pressure braking pressure.

The electronic brake system and a method of operating the same according to embodiments of the disclosure may have improved performance and operational reliability.

The electronic brake system and a method of operating the same according to embodiments of the disclosure may stably provide braking pressure even if a failure of components occurs or pressurized medium leaks.

The electronic brake system and a method of operating the same according to embodiments of the disclosure may improve assembly and productivity of the product and reduce manufacturing cost of the product.

BRIEF DESCRIPTION OF DRAWINGS

These and/or other aspects of the disclosure will become apparent and more readily appreciated from the following description of the exemplary embodiments, taken in conjunction with the accompanying drawings, of which:

FIG. 1 is a hydraulic circuit diagram illustrating an electronic brake system according to a first embodiment of the disclosure;

FIG. 2 is a view illustrating an operating state of a pedal simulator of the electronic brake system according to the first embodiment of the disclosure;

FIG. 3 is a hydraulic circuit diagram illustrating a state in which the electronic brake system performs a first braking mode according to the first embodiment of the disclosure;

FIG. 4 is a hydraulic circuit diagram illustrating a state in which the electronic brake system performs a second braking mode according to the first embodiment of the disclosure;

FIG. 5 is a hydraulic circuit diagram illustrating a state in which the electronic brake system releases a second braking mode according to the first embodiment of the disclosure;

FIG. 6 is a hydraulic circuit diagram illustrating a state in which the electronic brake system releases the first braking mode according to the first embodiment of the disclosure;

FIG. 7 is a hydraulic circuit diagram illustrating a state in which the electronic brake system performs an abnormal operation mode (a fallback mode) according to the first embodiment of the disclosure; and FIG. 8 is a hydraulic circuit diagram illustrating an electronic brake system according to a second embodiment of the disclosure.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

FIG. 1 is a hydraulic circuit diagram illustrating an electronic brake system according to a first embodiment of the disclosure.

Referring to FIG. 1, an electronic brake system 1000 according to an exemplary embodiment of the disclosure includes a reservoir 1100 for storing a pressurized medium therein, an integrated master cylinder 1200 that provides a reaction force according to a pedal effort of a brake pedal 10 to a driver and pressurizes and discharges the pressurized medium such as brake oil accommodated thereinside, a hydraulic pressure supply device 1300 that receives the driver's braking intention as an electrical signal by a pedal displacement sensor 11 for detecting a displacement of the brake pedal 10 and generates hydraulic pressure of the pressurized medium through an mechanical operation, a hydraulic control unit 1400 that controls the hydraulic pressure provided from the hydraulic pressure supply device 1300, hydraulic circuits 1510 and 1520 having a wheel cylinder 20 for performing braking each wheel by transmitting the hydraulic pressure of the pressurized medium, a dump control unit 1800 provided between the hydraulic pressure supply device 1300 and the reservoir 1100 to control a flow of the pressurized medium, backup flow paths 1610 and 1620 hydraulically connecting the integrated master cylinder 1200 and the hydraulic circuits 1510 and 1520, a reservoir flow path 1700 hydraulically connecting the reservoir 1100 and the integrated master cylinder 1200, and an electronic control unit (ECU, not shown) that controls the hydraulic pressure supply device 1300 and various valves based on hydraulic pressure information and pedal displacement information.

The integrated master cylinder 1200 includes a simulation chamber 1230a and a master chamber 1220a. When the driver applies a pedal force to the brake pedal 10 for braking, the integrated master cylinder 1200a provides a reaction force to the driver to a stable pedal feel, and at the same time as is provided to pressurize and discharge the pressurized medium accommodated therein.

The integrated master cylinder 1200 includes the master chamber 1220a, a master piston 1220 provided in the master chamber 1220a and displaceable by the operation of the brake pedal 10, a master spring 1221 for elastically supporting the master piston 1220, the simulation chamber 1230a, a simulation piston 1230 provided in the simulation chamber 1230a and displaceable by hydraulic pressure of a braking fluid accommodated in the master chamber 1220a, an elastic member 1250 provided in the simulation chamber 1230a to provide a pedal feel through an elastic restoring force generated during compression, and a simulator spring 1270 for elastically supporting the simulation piston 1230.

The master chamber 1220a and the simulation chamber 1230a may be sequentially formed from the brake pedal 10 side to the inside on the cylinder block 1210 of the integrated master cylinder 1200. Furthermore, the simulation piston 1230 and the master piston 1220 are respectively disposed in the simulation chamber 1230*a* and the master chamber 1220*a* to pressurize the pressurized medium accommodated in each chamber or to form a negative pressure according to forward and backward movements.

In the master chamber 1220*a*, the braking fluid may be introduced and discharged by a first hydraulic port 1280*a* and a second hydraulic port 1280*b*. In the simulation chamber 1230*a*, the braking fluid may be introduced and discharged by a third hydraulic port 1280*c* and a fourth hydraulic pressure port 1280*b*.

The first hydraulic port 1280*a* may be connected to a first reservoir flow path 1710, and the second hydraulic port 1280*b* may be connected to the first backup flow path 1610. Furthermore, the third hydraulic port 1280*c* may be connected to a second reservoir flow path 1720, and the fourth hydraulic port 1280*d* may be connected to the second backup flow path 1620.

The first reservoir flow path 1710 connects the reservoir 1100 and the master chamber 1220*a*, and the second reservoir flow path 1720 connects the reservoir 1100 and the simulation chamber 1230*a*. The simulation chamber 1230*a* may communicate with the reservoir 1100 through a communication hole 1231 formed in the simulation piston 1230.

A support member 1240 for accommodating one end of the elastic member 1250 is provided at the end of the integrated master cylinder 1200, and the other end of the elastic member 1250 may be supported by the simulation piston 1230.

Opposite ends of the simulator spring 1270 disposed in the simulation chamber 1230*a* may be elastically supported by the support member 1240 and the simulation piston 1230, respectively.

As the driver operates the brake pedal 10 to vary the displacement, the master piston 1220 moves, and at this time, the master spring 1221 is compressed. Thereafter, when the pedal effort of the brake pedal 10 is released, the master piston 1220 may return to its original position while expanding by the elastic force of the master spring 1221.

The simulation piston 1230 is provided to have a displacement within a certain range in the simulation chamber 1230*a* by the hydraulic pressure of the braking fluid pressurized in the master chamber 1220*a*, and the elastic member 1250 is provided so that compression deformation is possible according to the movement of the simulation piston 1230.

The elastic member 1250 may be made of a material such as rubber that is compressible and expandable in response to the displacement of the simulation piston 1230.

The simulation flow path 1260 may be provided to connect the second backup flow path 1620 and the second reservoir flow path 1720. A simulator valve 1261 for controlling the flow of the braking fluid may be provided in the simulation flow path 1260.

The simulator valve 1261 may be provided as a normal closed type solenoid valve that is normally closed and operates to open the valve when an electrical signal is received from the ECU.

A simulator bypass flow path 1262 is connected to the simulation flow path 1260 to be paralleled to the simulator valve 1261, and a simulator check valve 1263 that allows only one-way flow of the braking fluid is provided in the simulator bypass flow path 1262.

The simulator check valve 1263 allows the flow of the braking fluid transmitted from the second reservoir flow path 1720 to the second backup flow path 1620, but blocks the flow of the braking fluid transmitted from the second backup flow path 1620 toward the second reservoir flow path 1720.

The hydraulic pressure supply device 1300 receives the driver's braking intention as an electrical signal from the pedal displacement sensor 11 that detects the displacement of the brake pedal 10 and generates hydraulic pressure of the braking fluid through mechanical operation.

The hydraulic pressure supply device 1300 includes a hydraulic pressure supply unit that provides pressure of the pressurized medium transmitted to the wheel cylinders 20, a motor (not shown) that generates a rotational force by an electrical signal of the pedal displacement sensor 11, and a power transmission unit (not shown) that converts a rotational motion into a linear motion to transmit to the hydraulic pressure supply unit.

The hydraulic pressure supply unit includes a cylinder block 1310 having a pressure chamber receiving and storing braking fluid, a hydraulic piston 1320 accommodated in the cylinder block 1310, a sealing member that provided between the hydraulic piston 1320 and the cylinder block 1310 to seal the pressure chamber, and a drive shaft 1390 that transmits power output from a actuator to the hydraulic piston 1320. Herein, the actuator may include the motor that generates a rotational force by the electrical signal of the pedal displacement sensor 11, and a power transmission unit that converts the rotational motion of the motor into the linear motion to transmit to the hydraulic pressure supply device 1300. The power transmission unit includes a worm and a worm gear, or a rack and a pinion gear.

The pressure chamber includes a first pressure chamber 1330 positioned in front of the hydraulic piston 1320 (left side of the drawings), and a second pressure chamber 1340 positioned in the rear of the hydraulic piston 1320.

The sealing member includes a piston sealing member 1350*a* provided between the hydraulic piston 1320 and the cylinder block 1310 to seal between the first pressure chamber 1330 and the second pressure chamber 1340, and drive shaft sealing member 1350*b* provided between the drive shaft 1390 and the cylinder blocks 1310 to seal openings of the second pressure chamber 1340 and the cylinder block 1310.

The first pressure chamber 1330 is connected to the reservoir 1100 through the dump control unit 1800, and may be supplied and receives the braking fluid from the reservoir 1100 or transmits the braking fluid of the first pressure chamber 1330 to the reservoir 1100.

The dump control unit 1800 includes a dump flow path 1810 connecting the reservoir 1100 and the first pressure chamber 1330, and a dump bypass flow path 1820 connected in parallel to the dump flow path 1810.

A dump check valve 1811 that allows only a flow of the braking fluid from the reservoir 1100 to the first pressure chamber 1330 may be provided in the dump flow path 1810, and a dump valve 1821 connected in parallel to the dump check valve 1811 in the dump flow path 1810 to control the flow of the braking fluid may be provided in the dump bypass flow path 1820.

The dump valve 1821 includes a bidirectional solenoid valve that controls the flow of the braking fluid between the first pressure chamber 1330 and the reservoir 1100, and it may be provided as a normal open type solenoid valve that is normally closed and operates to open the valve when an electrical signal is received from the ECU.

The second pressure chamber 1340 is connected to the first pressure chamber 1330 through the hydraulic control unit 1400, and may be supplied and accommodates the braking fluid from the first pressure chamber 1330 or transmit the braking fluid to the first pressure chamber 1330.

A reference numeral 1830 is a flow path for recovery the pressurized medium to the reservoir 1100 when the pressurized medium leaks between the sealing members.

The hydraulic control unit 1400 connects the hydraulic pressure supply device 1300 with the hydraulic circuits 1510 and 1520 that control the hydraulic pressure of the wheel cylinders 20, and may control a flow of braking fluid between the hydraulic pressure supply device 1300 and the hydraulic circuits 1510 and 1520.

In other words, the hydraulic control unit 1400 may transmit the hydraulic pressure provided from the hydraulic pressure supply device 1300 to the wheel cylinders 21, 22, 23, and 24 through the hydraulic circuits 1510 and 1520, and also the hydraulic control unit 1400 may control the flow of the braking fluid between the first pressure chamber 1330 and the second pressure chamber 1340.

The hydraulic circuits include the first hydraulic circuit 1510 that controls the flow of the braking fluid delivered to two wheel cylinders 21 and 22, and the second hydraulic circuit 1520 that controls the flow of the fluid delivered to the other two wheel cylinders 23 and 24.

The hydraulic control unit 1400 includes a first hydraulic flow path 1401 connecting the first pressure chamber 1330 and the second hydraulic circuit 1520, a second hydraulic flow path 1402 connecting the first hydraulic flow path 1401 and the first hydraulic circuit 1510, a third hydraulic flow path 1403 connecting the second pressure chamber 1340 and the first hydraulic flow path 1401, a fourth hydraulic flow path 1404 connecting the first hydraulic flow path 1401 and the third hydraulic flow path 1403, and a fifth hydraulic flow path 1405 connecting the third hydraulic flow path 1403 and the second hydraulic flow path 1402.

The first hydraulic flow path 1401 may be provided with a first valve 1411 for controlling the flow of the braking fluid. The first valve 1411 includes a check valve that allows only the flow of the pressurized medium from the first pressure chamber 1330 toward the hydraulic circuits 1510 and 1520.

The second hydraulic flow path 1402 may be branched from the first hydraulic flow path 1401 on downstream side of the first valve 1411 to connect to the first hydraulic circuit 1510.

The second hydraulic flow path 1402 may be provided with a second valve 1412 for controlling the flow of the pressurized medium. The second valve 1412 may be provided as a normal closed type solenoid valve that is normally closed and operates to open the valve when an electrical signal is received from the ECU.

The third hydraulic flow path 1403 may be connected to the second pressure chamber 1340 and the first hydraulic flow path 1401 on downstream side of the first valve 1411.

The third hydraulic flow path 1403 may be provided with a third valve 1413 for controlling the flow of the braking fluid. The third valve 1413 may be provided as a normal open type solenoid valve that is normally open and operates to be closed the valve when an electrical signal is received from the ECU.

The fourth hydraulic flow path 1404 may connect the first hydraulic flow path 1401 on upstream side of the first valve 1411 on and the third hydraulic flow path 1403 on downstream side of the third valve 1413.

The fourth hydraulic flow path 1404 may be provided with a fourth valve 1414 for controlling the flow of the braking fluid. The fourth valve 1414 may be provided as a normal closed type solenoid valve that is normally closed and operates to open the valve when an electrical signal is received from the ECU.

The fifth hydraulic flow path 1405 may connect the third hydraulic flow path 1403 on downstream side of the third valve 1413 and the second hydraulic flow path 1402 on downstream side of the second valve 1412.

The fifth hydraulic flow path 1405 may be provided with a fifth valve 1415 for controlling the flow of the braking fluid. The fifth valve 1415 includes a check valve that allows only the flow of the pressurized medium from the third hydraulic flow path 1403 toward the second hydraulic flow path 1402.

The first hydraulic circuit 1510 receives the hydraulic pressure from the hydraulic pressure supply device 1300 through the second hydraulic flow path 1402, and the second hydraulic pressure flow path 1402 may be branched into first and second inlet flow paths 1511 and 1512 connected to the first wheel cylinder 21 and the second wheel cylinder 22, respectively.

The second hydraulic circuit 1520 receives the hydraulic pressure from the hydraulic pressure supply device 1300 through the first hydraulic flow path 1401, and the first hydraulic pressure flow path 1401 1402 may be branched into third and fourth inlet flow paths 1521 and 1522 connected to the third wheel cylinder 23 and the fourth wheel cylinder 24, respectively.

First and second inlet valves 1511a and 1512a are provided in the first and second inlet flow paths 1511 and 1512 to control the flow of the braking fluid and the hydraulic pressure transmitted to the first and second wheel cylinders 21 and 22. The first and second inlet valves 1511a and 1512a may be provided as normally open type solenoid valves respectively arranged on upstream side of the first and second wheel cylinders 21 and 22.

First and second check valves 1513a and 1514a respectively connected in parallel to the first and second inlet valves 1511a and 1512a may be provided in the first hydraulic circuit 1510.

The first and second check valves 1513a and 1514a are provided in first and second inlet bypass flow paths 1513 and 1514 connecting the front and rear with respect to the first and second inlet valves 1511a and 1512a on the first and second inlet flow paths 1511 and 1512, respectively, and allow only the flow of the braking fluid from the first and second wheel cylinders 21 and 22 toward the hydraulic pressure supply device 1300 and block the flow of the braking fluid from the hydraulic pressure supply device 1300 toward the first and second wheel cylinders 21 and 22.

The first and second check valves 1513a and 1514a may quickly release the hydraulic pressure of the braking fluid applied to the first and second wheel cylinders 21 and 22. Furthermore, the first and second check valves 1513a and 1514a allow the hydraulic pressure of the braking fluid applied to the first and second wheel cylinders 21 and 22 to flow into the hydraulic pressure supply device 1300 even when the first and second inlet valves 1511a and 1512a do not operate normally.

To improve performance when the first and second wheel cylinders 21 and 22 are released from braking, the first hydraulic circuit 1510 includes first and second outlet flow paths 1515 and 1516 that are respectively branched from the first and second inlet flow paths 1511 and 1512 to be connected to the reservoir 1100.

Each of the first and second outlet flow paths 1515 and 1516 may be branched from a junction of the first and second inlet flow paths 1511 and 1512 and the first and second inlet bypass flow paths 1513 and 1514 on the downstream side of the first and second inlet valves 1511a and 1512a to be connected to the reservoir 1100.

First and second outlet valves 1515a and 1516a are provided in the first and second outlet flow paths 1515 and 1516, respectively. Each of the first and second outlet valves 1515a and 1516a may be provided as a normally closed type solenoid valve connected to the first and second wheel cylinders 21 and 22 to control the flow of the braking fluid exiting from the first and second wheel cylinders 21 and 22.

When depressurization braking of the first and second wheel cylinders 21 and 22 is required, the first and second outlet valves 1515a and 1516a may be controlled to be selectively opened to reduce the pressure of the first and second wheel cylinders 21 and 22.

On the other hand, the first inlet bypass flow path 1513 on the downstream side of the first check valve 1513a may be connected to the first backup flow path 1610.

Third and fourth inlet valves 1521a and 1522a are provided in the third and fourth inlet flow paths 1521 and 1522 to control the flow of the braking fluid and the hydraulic pressure delivered to the second and third wheel cylinders 23 and 24, respectively. The third and fourth inlet valves 1521a and 1522a may be provided as normal open type solenoid valves respectively arranged on upstream side of the third and fourth wheel cylinders 23 and 24.

Third and fourth check valves 1523a and 1524a respectively connected in parallel to the third and fourth inlet valves 1521a and 1522a may be provided in the second hydraulic circuit 1520.

The third and fourth check valves 1523a and 1524a are provided in third and fourth inlet bypass flow paths 1523 and 1524 connecting the front and rear with respect to the third and fourth inlet valves 1521a and 1522a on the second and third inlet flow paths 1521 and 1522, respectively, and allow only the flow of the braking fluid from the third and fourth wheel cylinders 23 and 24 toward the hydraulic pressure supply device 1300 and block the flow of the braking fluid from the hydraulic pressure supply device 1300 toward the third and fourth wheel cylinders 23 and 24.

The third and fourth check valves 1523a and 1524a may quickly release the hydraulic pressure of the braking fluid applied to the third and fourth wheel cylinders 23 and 24. Furthermore, the third and fourth check valves 1523a and 1524a allow the hydraulic pressure of the braking fluid applied to the third and fourth wheel cylinders 23 and 24 to flow into the hydraulic pressure supply device 1300 even when the third and fourth inlet valves 1512a and 1522a do not operate normally.

To improve performance when the third and fourth wheel cylinders 23 and 24 are released from braking, the second hydraulic circuit 1520 includes third and fourth outlet flow paths 1525 and 1526 that are respectively branched from the third and fourth inlet flow paths 1521 and 1522 to be connected to the reservoir 1100.

Each of the third and fourth outlet flow paths 1525 and 1526 may be branched from a junction of the third and fourth inlet flow paths 1521 and 1522 and the third and fourth inlet bypass valves 1523 and 1524 on the downstream of the third and fourth inlet valves 1521a and 1522a to be connected to the reservoir 1100.

The third and fourth outlet flow paths 1525 and 1526 are provided with second cut valves 1525a and 1526a, respectively. Each of the second cut valves 1525a and 1526a may be provided as a normally open type solenoid valve connected to the third and fourth wheel cylinders 23 and 24 to control the flow of the braking fluid exiting from the third and fourth wheel cylinders 23 and 24.

When depressurization braking of the third and fourth wheel cylinders 23 and 24 is required, the second outlet valves 1525a and 1526a may be controlled to be selectively opened to reduce the pressure of the third and fourth wheel cylinders 23 and 24.

On the other hand, the second cut valves 1525a and 1526a may be connected to the second backup flow path 1620 and be connected to the reservoir 1100 through the second backup flow path 1620.

The first and second backup flow paths 1610 and 1620 directly supply the braking fluid discharged from the integrated master cylinder 1200 to the wheel cylinders to implement braking in the case of a fallback mode in which a normal operation is impossible due to a failure of device.

The first backup flow path 1610 connects the master chamber 1220a of the integrated master cylinder 1200 and the first hydraulic circuit 1510, and the second backup flow path 1620 connects the simulation chamber 1230a of the integrated master cylinder 1200 and the second hydraulic circuit 1520.

The first backup flow path 1610 is connected to the first inlet bypass flow path 1513 on the downstream side of the first check valve 1513a on the first hydraulic circuit 1510, and the second backup flow path 1620 is connected to the third outlet flow path 1525 on the downstream side of the second cut valve 1525a and the fourth outlet flow path 1526 on the downstream side of the second cut valve 1526a, on the second hydraulic circuit 1520.

The first backup flow path 1610 is provided with a first cut valve 1611 for controlling the flow of the braking fluid. The first cut valve 1611 may be provided as a normal open type solenoid valve that is normally open and operates to be closed the valve when an electrical signal is received from the ECU.

The second backup flow path 1620 is not provided with a first cut valve for controlling the flow of the pressurized medium, and the second cut valves 1525a and 1526a installed on the second hydraulic circuit 1520 may be performed the function of the first cut valve.

Hereinafter, a pedal simulation operation of the electronic brake system according to the first embodiment of the disclosure will be described.

FIG. 2 is a view illustrating a pedal simulation operating state according to the exemplary embodiment of the disclosure.

Referring to FIG. 2, when the driver operates the brake pedal 10 and applies the pedal effort during the normal operation, the first cut valve 1611 provided in the first backup flow path 1610 is closed, and the simulator valve 1261 is opened, and the second cut valves 1525a and 1526a are closed.

The master piston 1220 moves according to the displacement of the brake pedal 10 to pressurize the braking fluid in the master chamber 1220a, and the pressurized hydraulic pressure presses the simulation piston 1230.

The displacement of the simulation piston 1230 compresses the elastic member 1250, and the braking fluid of the simulation chamber 1230a is transmitted to the reservoir 1100 through in turn the simulation flow path 1260 and the second backup flow path 1620. Accordingly, it is possible to provide a pedal feel to the driver by the elastic restoring force caused by the compression of the elastic member 1250.

Thereafter, when the driver releases the pedal effort of the brake pedal 10, the simulation piston 1230 and the master piston 1220 return to their original positions by a restoring force of the simulator spring 1270 and the elastic member 1250.

Hereinafter, an operating state in which the electronic brake system according to the first embodiment of the disclosure provides braking pressure in a normal operation mode will be described.

In the normal operation mode of the electronic brake system of the first embodiment, as the hydraulic pressure transmitted from the hydraulic pressure supply device 1300 to the wheel cylinders increases, a first braking mode and a second braking mode may be divided to be operated.

In the first braking mode, the hydraulic pressure from the hydraulic pressure supply device 1300 is primarily provided to the wheel cylinders, and in the second braking mode, the hydraulic pressure from the hydraulic pressure supply device 1300 is secondarily provided to the wheel cylinders, which is higher than that of the first braking mode.

The first and second braking modes may be switched by differently operating the hydraulic pressure supply device 1300 and the hydraulic control unit 1400. The hydraulic pressure supply device 1300 may provide a sufficiently high hydraulic pressure of the pressurized medium without a high-spec motor by utilizing the first and second braking modes, and furthermore resulting in preventing unnecessary load applied to the motor. Accordingly, a stable braking force may be secured while reducing the cost and weight of the brake system, and durability and operational reliability of the device may be improved.

FIG. 3 is a hydraulic circuit diagram illustrating a state in which the electronic brake system according to the first embodiment of the disclosure performs a first braking mode.

Referring to FIG. 3, when the driver depresses the brake pedal 10 at an initial stage of braking, the motor (not shown) operates to rotate in one direction, the rotational force of the motor is delivered to the hydraulic pressure supply device 1300 by the power transmission unit, and the hydraulic piston 1320 of the hydraulic pressure supply device 1300 moves forward to generate the hydraulic pressure in the first pressure chamber 1330. The hydraulic pressure discharged from the first pressure chamber 1330 is transmitted to each wheel cylinders 20 through the hydraulic control unit 1400, the first hydraulic circuit 1510, and the second hydraulic circuit 1520 to generate braking force.

In the first braking mode, the simulator valve 1261 is switched to an open state, and the first cut valve 1611 and the second cut valves 1525*a* and 1526*a* provided in the second hydraulic circuit 1520 are switched to a closed state. Herein, the second cut valves 1525*a* and 1526*a* perform the function of the first cut valve blocking the braking fluid provided to the second hydraulic circuit 1620 through the second backup flow path 1620. Accordingly, the integrated master cylinder 1200 performs the above-described pedal simulator operation.

Furthermore, the second valve 1412 and the fourth valve 1414 of the hydraulic control unit 1400 are switched to an open state. Accordingly, as the hydraulic piston 1320 advances, the hydraulic pressure formed in the first pressure chamber 1330 sequentially passes through the first hydraulic flow path 1401 and the second hydraulic flow path 1402 to primarily transmit to the wheel cylinders 20 provided in the first and second hydraulic circuits 1510 and 1520.

Specifically, as the hydraulic piston 1320 advances, a part of the hydraulic pressure formed in the first pressure chamber 1330 is provided to the second pressure chamber 1340 sequentially passing through the fourth hydraulic flow path 1404 and the third hydraulic flow path 1403, and another part thereof is provided to the second hydraulic circuit 1520 through the first hydraulic flow path 1401, and the other part thereof is provided to the first hydraulic circuit 1510 through the second hydraulic flow path 1402. In this case, a part of the hydraulic pressure flowing in the third hydraulic flow path 1403 may be provided to the first hydraulic circuit 1510 through the fifth hydraulic flow path 1405. Accordingly, a stable provision of the hydraulic pressure toward the first hydraulic circuit 1510 may be possible even when the second valve 1412 due to a failure such as sticking does not operate in the first braking mode.

The first and second inlet valves 1511*a* and 1511*b* provided in the first hydraulic circuit 1510 maintain an open state, and the first and second outlet valves 1515*a* and 1516*a* maintain a closed state, leading to prevent the hydraulic pressure of the pressurized medium from leaking to the reservoir 1100 side.

The third and fourth inlet valves 1521*a* and 1522*a* provided in the second hydraulic circuit 1520 maintain an open state, and the second cut valves 1525*a* and 1526*a* maintain a closed state, leading to prevent leakage of the hydraulic pressure of the pressurized medium to the reservoir 1100 side.

In the first braking mode, the dump check valve 1821 provided in the dump flow path 1820 connected to the first pressure chamber 1330 allows the flow of the pressurized medium from the reservoir 1100 to the first pressure chamber 1330, but blocks the flow of the pressurized medium from the first pressure chamber 1330 toward the reservoir 1100. Accordingly, all of the hydraulic pressure of the pressurized medium formed in the first pressure chamber 1330 by the advance of the hydraulic piston 1320 is transmitted to the first hydraulic flow path 1401, so that braking is rapidly implemented.

The electronic brake system 1000 according to the exemplary embodiment may switch from the first braking mode to the second braking mode when the braking pressure higher than that of the first braking mode is to be provided.

FIG. 4 is a hydraulic circuit diagram illustrating a state in which the electronic brake system according to the first embodiment of the disclosure performs the second braking mode.

Referring to FIG. 4, in response to that the displacement or operating speed of the brake pedal 10 detected by the pedal displacement sensor 11 is higher than a predetermined level, or the hydraulic pressure detected by the pressure sensor is higher than a predetermined level, the ECU determines that a higher braking pressure is required and may switch from the first braking mode to the second braking mode.

When the first braking mode is switched to the second braking mode, the motor operates to rotate in the other direction, and the rotational force of the motor is transmitted to the hydraulic pressure supply unit by the power transmission unit to cause the hydraulic piston 1320 moves backward, resulting in generating the hydraulic pressure in the second pressure chamber 1340. The hydraulic pressure discharged from the second pressure chamber 1340 is transmitted to each wheel cylinder 20 through the hydraulic control unit 1400, the first hydraulic circuit 1510, and the second hydraulic circuit 1520 to generate braking force.

In the second braking mode, the simulator valve 1261 is in an open state, the first cut valve 1611 and the second cut valves 1525*a* and 1526*a* provided in the second hydraulic circuit 1520 are in a closed state, and thus the master cylinder 1200 operates as a pedal simulator.

Furthermore, the fourth valve 1414 of the hydraulic control unit 1400 is switched to a closed state, the second valve 1412 is maintained in an open state, and the dump valve 1821 is switched to an open state. Accordingly, the hydraulic pressure formed in the second pressure chamber 1340 while the hydraulic piston 1320 moves backward is secondarily provided to the second hydraulic circuit 1520 sequentially through the first hydraulic flow path 1401 and the third hydraulic flow path 1403, a part of the hydraulic pressure provided to the first hydraulic flow path 1401 is secondarily provided to the first hydraulic circuit 1510 through the second hydraulic flow path 1402. In this case, a part of the hydraulic pressure flowing in the third hydraulic flow path 1403 may be provided to the first hydraulic circuit 1510 through the fifth hydraulic flow path 1405. Accordingly, a stable provision of the hydraulic pressure toward the first hydraulic circuit 1510 may be possible even when the second valve 1412 due to a failure such as sticking does not operate.

The first and second inlet valves 1511*a* and 1511*b* provided in the first hydraulic circuit 1510 maintain the open state, and the first and second outlet valves 1512*a* and 1512*b* maintain the closed state, leading to prevent the hydraulic pressure of the pressurized medium from leaking to the reservoir 1100 side.

The third and fourth inlet valves 1521*a* and 1522*a* provided in the second hydraulic circuit 1520 are provided in the open state, and the second cut valves 1525*a* and 1526*a* maintain the closed state, leading to prevent the leakage of the hydraulic pressure.

On the other hand, in the second braking mode, the dump check valve 1811, which is provided in the dump flow path 1810 connected to the first pressure chamber 1330, and the dump valve 1821, which is provided in the dump bypass flow path 1820, allow the flow of the braking fluid from the reservoir 1100 toward the first pressure chamber 1330.

Hereinafter, an operation method of releasing the braking in the normal operation mode of the electronic brake system 1000 according to the first embodiment will be described.

FIG. 5 is a hydraulic circuit diagram illustrating a state in which the second braking mode is released while the hydraulic piston of the electronic brake system according to the first embodiment of the disclosure moves forward.

Referring to FIG. 5, when the pedal effort applied to the brake pedal 10 is released, the motor generates the rotational force in one direction to transmit to the power transmission unit, and the power transmission unit advances the hydraulic piston 1320. Accordingly, while releasing the hydraulic pressure of the second pressure chamber 1340, a negative pressure may be generated, so that the pressurized medium of the wheel cylinders 20 may be transmitted to the second pressure chamber 1340.

In the second braking release mode, the first cut valve 1611, the fourth valve 1414, and the second cut valves 1525*a* and 1526*a* are in the closed state, and the simulator valve 1261, the dump valve 1821, the second valve 1412, and the third valve 1413 are in the open state.

Specifically, the hydraulic pressure of the pressurized medium applied to the first and second wheel cylinders 21 and 22 provided in the first hydraulic circuit 1510 is returned to the second pressure chamber 1340 through the first and second inlet flow paths 1511 and 1512, the second the hydraulic flow path 1402, the first hydraulic flow path 1401, and the third hydraulic flow path 1403 in sequence. At this time, the first and second inlet valves 1511*a* and 1511*b* provided in the first hydraulic circuit 1510 maintain the open state, and the first and second outlet valves 1512*a* and 1512*b* maintain the closed state.

Furthermore, the hydraulic pressure of the pressurized medium applied to the third and fourth wheel cylinders 23 and 24 provided in the second hydraulic circuit 1520 by the negative pressure generated in the second pressure chamber 1340 is recovered to the second pressure chamber 1340 through the third and fourth inlet flow paths 1521 and 1522, the first hydraulic flow path 1401, and the third hydraulic flow path 1403 in sequence. The third and fourth inlet valves 1521*a* and 1521*b* provided in the second hydraulic circuit 1520 maintain the open state, and the second cut valves 1525*a* and 1526*a* is maintained in the closed state.

When the second braking mode is released, the dump valve 1821 provided in the dump bypass flow path 1820 is switched to the open state, and provides the pressurized medium of the first pressure chamber 1330 according to the forward movement of the hydraulic piston 1320 to the reservoir 1100.

After the release of the second braking mode is completed, the electronic brake system may be switched to the releasing operation of the first braking mode to completely release the braking pressure applied to the wheel cylinders 20.

FIG. 6 is a hydraulic circuit diagram illustrating a state in which the hydraulic piston of the electronic brake system according to the first embodiment of the disclosure releases the first braking mode while moving backward.

Referring to FIG. 6, when the pedal effort applied to the brake pedal 10 is released, the motor generates rotational force in the other direction to transmit to the power transmission unit, and the power transmission unit moves the hydraulic piston 1320 backward. Accordingly, a negative pressure may be generated in the first pressure chamber 1330, and thus the pressurized medium of the wheel cylinders 20 may be transmitted to the first pressure chamber 1330.

In the first braking release mode, the first cut valve 1611 and the dump valve 1821 are in the closed state, and the simulator valve 1261, the second valve 1412, the third valve 1413, and the fourth valve 1414 is in the open state.

Specifically, the hydraulic pressures of the first and second wheel cylinders 21 and 22 provided in the first hydraulic circuit 1510 are returned to the first pressure 1330 through the first and second inlet flow paths 1511 and 1512, the second the hydraulic flow path 1402, the first hydraulic flow path 1401, the third hydraulic flow path 1403, the fourth hydraulic flow path 1404, and the first hydraulic flow path 1403 in sequence. At this time, the first and second inlet valves 1511*a* and 1511*b* provided in the first hydraulic circuit 1510 maintain the open state, and the first and second outlet valves 1512*a* and 1512*b* maintain the closed state.

Furthermore, the hydraulic pressure of the pressurized medium applied to the third and fourth wheel cylinders 23 and 24 provided in the second hydraulic circuit 1520 by the negative pressure generated in the first pressure chamber 1330 is recovered to the first pressure chamber 1330 through the third and fourth inlet flow paths 1521 and 1522, the first hydraulic flow path 1401 on the downstream side of the first valve 1411, the third hydraulic flow path 1403, the fourth hydraulic flow path 1404, the first hydraulic flow path on the upstream side of the first valve 1411 in sequence. The third and fourth inlet valves 1521*a* and 1522*a*, and the second cut valves 1525*a* and 1526*a* provided in the second hydraulic circuit 1520 are maintained in the open state. Accordingly, the hydraulic pressure of the third and fourth wheel cylinders 23 and 24 may be provided to the reservoir 1100 through the second backup flow path 1620.

Furthermore, the pressurized medium accommodated in the second pressure chamber 1340 by the backward movement of the hydraulic piston 1320 is discharged to the first pressure chamber 1330 through the third and fourth hydraulic flow paths 1403 and 1404, thereby the hydraulic piston 1320 may move back quickly and smoothly.

Hereinafter, when the electronic brake system according to the first embodiment of the disclosure does not operate normally, in other words, an operating state of a fallback mode will be described.

FIG. 7 is a hydraulic circuit diagram illustrating an operating state in an abnormal operation mode (fallback mode) when the electronic brake system according to the exemplary embodiment does not operate normally due to a failure of the device.

Referring to FIG. 7, in the abnormal operation mode, each valve is controlled to an initial braking state, which is a non-operational state. At this time, when the driver applies the pedal effort of the brake pedal 10, the master piston 1220 connected to the brake pedal 10 moves forward and the displacement occurs. Because the first cut valve 1611 is provided in the open state in the non-operational state, the pressurized medium accommodated in the master chamber 1220a by the advancement of the master piston 1220 is transmitted to the first and second wheel cylinders 21 and 22 of the circuit 1510 through the first backup flow path 1610, thereby braking is implemented.

Furthermore, the pressurized medium accommodated in the master chamber 1220a advances the simulation piston 1230 to generate the displacement, and the pressurized medium accommodated in the simulation chamber 1230a by the displacement of the simulation piston 1230 is transmitted to the third and fourth wheel cylinders 23 and 24 of the second hydraulic circuit 1520 through the second backup flow path 1620, thereby braking is implemented.

In the abnormal operation mode, the first to fourth inlet valves 1511a, 1511b, 1521a, and 1521b and the second cut valves 1525a and 1526a, which are provided in the first and second hydraulic circuits 1510 and 1520, are in the open state, so the hydraulic pressure transmitted from the master chamber 1220a and the simulation chamber 1230a of the integrated master cylinder 1200 may be directly transmitted to each wheel cylinder 20, so that braking stability may be improved as well as quick braking may be achieved.

Hereinafter, an electronic brake system according to a second embodiment of the disclosure will be described. Hereinafter, the same reference numerals are assigned to the same components as in the above-described embodiment, and detailed descriptions thereof are omitted.

FIG. 8 is a hydraulic circuit diagram illustrating the electronic brake system according to the second embodiment of the disclosure. Referring to FIG. 8, a hydraulic control unit 2400 according to the embodiment of the disclosure includes a first hydraulic flow path 2401 connecting the first pressure chamber 1330 and the first hydraulic circuit 1510, a second hydraulic flow path 2402 connecting the first hydraulic flow path 2401 and the second hydraulic circuit 1520, the third hydraulic flow path 1403 connecting the second pressure chamber 1340 and the first hydraulic flow path 2401, the fourth hydraulic flow path 1404 connecting the first hydraulic flow path 2401 and the third hydraulic flow path 1403, and the fifth hydraulic flow path 1405 connecting the third hydraulic flow path 1403 and the second hydraulic flow path 2402.

In the exemplary embodiment, except that the first hydraulic flow path 2401 is connected to the first hydraulic circuit 1510 and the second hydraulic flow path 2402 is connected to the second hydraulic circuit 1520, the hydraulic circuit diagram is the same as that of the above-described first embodiment.

Specifically, the first hydraulic circuit 1510 receives the hydraulic pressure from the hydraulic pressure supply device 1300 through the first hydraulic flow path 2401, and the first hydraulic pressure flow path 2401 may be provided to be branched into the first and second inlet flow paths 1511 and 1512 connected to the first and second wheel cylinders 21 and 22.

The second hydraulic circuit 1520 receives the hydraulic pressure from the hydraulic pressure supply device 1300 through the second hydraulic flow path 2402, and the second hydraulic flow path 2402 may be provided to be branched into the third and fourth inlet flow paths 1521 and 1522 connected to the third and fourth wheel cylinders 23 and 24.

With these configurations, in the case of the first and second braking modes, the hydraulic pressure formed in the first and second pressure chambers 1330 and 1340 respectively due to the forward and backward movements of the hydraulic piston 1320 is provided to the first hydraulic circuit 1510 through the first hydraulic flow path 2401 and is provided to the second hydraulic circuit 1520 through the second hydraulic flow path 2402.

Although a few embodiments of the disclosure have been shown and described, it would be appreciated by those skilled in the art that changes may be made in these embodiments without departing from the principles and spirit of the disclosure, the scope of which is defined in the claims and their equivalents.

The invention claimed is:

1. An electronic brake system, comprising:
a reservoir configured to store a pressure medium;
an integrated master cylinder including a master chamber and a simulation chamber;
a reservoir flow path configured to communicate the integrated master cylinder with the reservoir;
a hydraulic pressure supply device including a first pressure chamber and a second pressure chamber partitioned by a hydraulic piston moving in a cylinder block by an electrical signal output in response to a displacement of a brake pedal, the first pressure chamber positioned at a forward side of the hydraulic piston and the second pressure chamber positioned at a backward side of the hydraulic piston;
a first hydraulic circuit and a second hydraulic circuit configured to control hydraulic pressure of wheel cylinders; and
a hydraulic control unit configured to control a flow of the hydraulic pressure provided from the hydraulic pressure supply device to the first and second hydraulic circuits;
wherein the hydraulic control unit comprises:
a first hydraulic flow path connecting the first pressure chamber and one of the first and second hydraulic circuits and configured to provide the hydraulic pressure of the first pressure chamber to one of the first and second hydraulic circuits;
a second hydraulic flow path branched from the first hydraulic flow path to connect to the other one of the first and second hydraulic circuits and configured to provide the hydraulic pressure of the first hydraulic flow path to the other one of the first and second hydraulic circuits;
a third hydraulic flow path branched from the first hydraulic flow path on upstream side of a branch point of the second hydraulic flow path to connect the second pressure chamber and configured to provide the hydraulic pressure of the second pressure chamber to the first hydraulic flow path; and a fourth hydraulic flow path branched from the first hydraulic flow path on upstream side of a branch point of the third hydraulic flow path to connect the third hydraulic flow path and configured to flow selectively the pressure medium between the first pressure chamber and the second pressure chamber.

2. The electronic brake system of claim 1,
wherein the hydraulic control unit comprises:
a first valve provided in the first hydraulic flow path between respective branch points of the third and fourth hydraulic flow paths to control the flow of the pressure medium;
a second valve provided in the second hydraulic flow path to control the flow of the pressure medium;
a third valve provided in the third hydraulic flow path on upstream side of a junction of the third and fourth hydraulic flow paths to control the flow of the pressure medium; and
a fourth valve provided in the fourth hydraulic flow path to control the flow of the pressure medium.

3. The electronic brake system of claim 2, wherein
the first valve comprises a check valve allowing only a flow of the pressure medium from the hydraulic pressure supply device toward the wheel cylinders, and
each of the second to fourth valves comprises a solenoid valve for controlling a bidirectional flow of the pressure medium.

4. The electronic brake system of claim 1, wherein
the integrated master cylinder comprises:
a master piston provided to be displaceable by the brake pedal and pressurizing the master chamber;
a simulation piston provided to be displaceable by the hydraulic pressure of the pressure medium accommodated in the master chamber and pressurizing the simulation chamber; and
an elastic member provided in the simulation chamber and providing a reaction force to the simulation piston;
wherein the master piston, the simulation piston, and the elastic member are sequentially arranged in a line in the cylinder block of the integrated master cylinder.

5. The electronic brake system of claim 4, further comprising:
a first backup flow path connecting the master chamber and the first hydraulic circuit and including a first cut valve configured to control the flow of the pressure medium; and
a second backup flow path connecting the simulation chamber and the second hydraulic circuit and including a second cut valve configured to control the flow of the pressure medium.

6. The electronic brake system of claim 5, wherein
the reservoir flow path comprises:
a first reservoir flow path connecting the reservoir and the master chamber; and
a second reservoir flow path connecting the reservoir and the simulation chamber.

7. The electronic brake system of claim 6, further comprising:
a simulation flow path connecting the second backup flow path and the second reservoir flow path;
a simulator valve provided in the simulation flow path to control the flow of the pressure medium in the simulation flow path; and
a simulator bypass flow path connected in parallel with the simulator valve on the simulation flow path and provided with a simulator check valve allowing only a flow of the braking fluid transmitted from the second reservoir flow path to the second backup flow path.

8. The electronic brake system of claim 5, wherein the first hydraulic circuit comprises:
first and second inlet flow paths branched from the second hydraulic flow path to connect to first and second wheel cylinders, respectively, the first and second inlet flow paths including first and second inlet valves, respectively;
first and second inlet bypass flow paths connected in parallel to the first and second inlet valves on the first and second inlet flow paths, respectively, and provided with first and second check valves allowing only the flow of the pressure medium toward the second hydraulic flow path;
first and second outlet flow paths branched from the first and second inlet flow paths on downstream side of the first and second inlet valves, respectively to connect to the reservoir, and provided with first and second outlet valves, respectively.

9. The electronic brake system of claim 8, wherein the second hydraulic circuit comprises:
third and fourth inlet flow paths branched from the first hydraulic flow path to connect to third and fourth wheel cylinders, respectively, the third and fourth inlet flow paths including third and fourth inlet valves, respectively;
third and fourth inlet bypass flow paths connected in parallel to the third and fourth inlet valves on the third and fourth inlet flow paths, respectively, and provided with third and fourth check valves allowing only the flow of the pressure medium toward the first hydraulic flow path;
third and fourth outlet flow paths branched from the third and fourth inlet flow paths on downstream side of the third and fourth inlet valves, respectively to connect to the second backup flow path.

10. The electronic brake system of claim 9, further comprising:
a dump flow path connecting between the first pressure chamber and the reservoir and provided with a dump check valve allowing only the flow of the pressure medium toward the first pressure chamber; and
a dump bypass flow path connected in parallel to the dump check valve on the dump flow path and provided with a dump valve configured to control the flow of the pressure medium.

11. The electronic brake system of claim 3, wherein
the hydraulic control unit further comprises a fifth hydraulic flow path connecting the third hydraulic flow path and the second hydraulic flow path so as to provide the pressure medium of the third hydraulic flow path to the other one of the first and second hydraulic circuits.

12. The electronic brake system of claim 11, wherein
the hydraulic control unit further comprises a fifth valve provided in the fifth hydraulic flow path to control the flow of the pressure medium; and
the fifth valve comprises a check valve allowing only the flow of the pressure medium from the hydraulic pressure supply device toward the wheel cylinders.

13. A method of operating the electronic brake system according to claim 3, the method comprising:
a first braking mode in which the hydraulic piston presses the first pressure chamber, and a second braking mode in which the hydraulic piston presses the second pressure chamber after the first braking mode.

14. The method of claim 13, wherein
in the first braking mode, the second valve, the third valve, and the fourth valve are open, and the hydraulic pressure of the first pressure chamber is provided to the second pressure chamber through the third hydraulic flow path and is provided to the first and second hydraulic circuits through the first and second hydraulic flow paths.

15. The method of claim 14, wherein
in the second braking mode, the second and third valves are open, the fourth valve is closed, and the hydraulic pressure of the second pressure chamber passes through the third hydraulic flow path, and the first and second hydraulic flow paths in sequence to be provided to the first and second hydraulic circuits, respectively.

16. The method of claim 14, wherein
in releasing of the first braking mode,
by a negative pressure formed in the first pressure chamber by moving the hydraulic piston to press the second pressure chamber in the first braking mode, the pressure medium provided in the first and second hydraulic circuits and the pressure medium of the first pressure chamber is recovered to the first pressure chamber.

17. The method of claim 15, wherein
in releasing of the second braking mode,
by a negative pressure formed in the second pressure chamber by moving the hydraulic piston to press the first pressure chamber in the second braking mode, the pressure medium of the first pressure chamber is provided to the reservoir while the pressure medium provided in the first and second hydraulic circuits is recovered to the first pressure chamber.

18. A method of operating the electronic brake system according to claim 7, the method comprising:
in a normal operation mode,
the first cut valve and the second cut valve are closed, the simulator valve is open, the hydraulic pressure of the master chamber pressurized by the master piston due to the operation of the brake pedal moves the simulation piston to compress the elastic member, and the reaction force of the elastic member is provided to a driver as a pedal feel.

19. The method of claim 18,
in abnormal operation mode,
the first cut valve, the second cut valve, and the simulator valve are open, the hydraulic pressure of the master chamber pressurized by the master piston due to the operation of the brake pedal is transmitted to the first hydraulic circuit through the first backup flow path, and the hydraulic pressure of the simulation chamber pressurized by the simulation piston is provided to the second hydraulic circuit through the second backup flow path.

* * * * *